(12) United States Patent
Oshima et al.

(10) Patent No.: US 8,277,018 B2
(45) Date of Patent: Oct. 2, 2012

(54) TILT ANGLE MAINTAINING APPARATUS AND RECORDING APPARATUS

(75) Inventors: Kenji Oshima, Shiojiri (JP); Kazuyoshi Iwama, Matsumoto (JP); Shigeto Omatsu, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 722 days.

(21) Appl. No.: 12/533,353

(22) Filed: Jul. 31, 2009

(65) Prior Publication Data
US 2010/0024589 A1 Feb. 4, 2010

(30) Foreign Application Priority Data

Aug. 1, 2008 (JP) ................................ 2008-199933

(51) Int. Cl.
*B41J 2/015* (2006.01)
(52) U.S. Cl. .......................................... 347/20; 347/37
(58) Field of Classification Search .................... 347/14, 347/19, 20, 23, 32, 37
See application file for complete search history.

(56) References Cited

FOREIGN PATENT DOCUMENTS

| JP | 02011423 A | * | 1/1990 |
|---|---|---|---|
| JP | 11-339125 | | 12/1999 |
| JP | 2001-111245 | | 4/2001 |
| JP | 2002-190854 | | 7/2002 |

* cited by examiner

*Primary Examiner* — Juanita D Jackson
(74) *Attorney, Agent, or Firm* — Workman Nydegger (57) ABSTRACT

A first ratchet claw and a second ratchet claw are formed on a lock member which is provided in a reciprocating manner with respect to a guide member, wherein a plurality of first and second ratchet recesses for being fitted to the first and second ratchet claw and the first and second ratchet claw are provided on the guide member along a sliding direction of the guide member, and wherein when a lever member which is slidably provided on the guide member is in the unlocked position, the first and second ratchet recesses are continuously formed along a sliding direction of the guide member arranged in an relationship in which at least one of the first and second ratchet recess does not face the first ratchet claw in the case of the first ratchet recess or the second ratchet claw in the case of the second ratchet recess.

4 Claims, 11 Drawing Sheets

TILT ANGLE MAINTAINING APPARATUS AND RECORDING APPARATUS

BACKGROUND

1. Technical Field

The present invention relates to a tilt angle maintaining apparatus for maintaining a tilt angle of a tilt section which is provided on a device body in a tilting manner, and to a recording apparatus such as a facsimile or a printer on which the tilt angle maintaining apparatus is provided.

2. Related Art

In an electronic device, an information display section (for example, which is configured to include a liquid crystal display unit and the like) for displaying a variety of information and an operation setting section provided with operation buttons and a power button for performing various operation settings are provided on a tilt panel. The tilt panel can be maintained to form an arbitrary angle so that a user can easily visually identify information or set the operations via a tilt angle maintaining mechanism.

In this tilt angle maintaining mechanism, for example, a ratchet mechanism as described in JP-A-2001-111245 and in JP-A-11-339125, that is, saw-shaped teeth are provided on a main body, and an engaging end for engaging with the saw-shaped teeth is provided on the tilt section. The tilt angle maintaining mechanism is configured to stepwise maintain a predetermined tilt angle by engaging the saw-shaped teeth and the engaging end.

In the known tilt angle maintaining mechanism as described above, even when external force is applied to the tilt section, the tilt angle is reliably maintained at a predetermined angle without any change. However, on the other hand, when the tilt angle maintaining mechanism is returned to its original position from the state of being maintained at an arbitrary angle, it is necessary to maintain the state in which the engaging end is separated from the saw-shaped teeth. Since the engaging end is provided on a rear surface side of the tilt section, operability for returning the tilt section to the original angle is bad, and the operations become complicated.

SUMMARY

An advantage of some aspects of the invention is to provide a tilt angle maintaining device which can be easily released from a maintaining state even while a tilt section is reliably maintained at a predetermined angle by a ratchet mechanism, and can return the tilt section to an original angle with good operability.

According to a first aspect of the invention, there is provided a tilt angle maintaining apparatus for maintaining a tilt angle of a tilt section, including: a tilt section which is rotatably provided with respect to a device body; a guide member which is slidably provided with respect to the device body and engaged with the tilt section to maintain an attitude of the tilt section; a lock member which is provided in the device body in a reciprocating manner with respect to the guide member, and advances with respect to the guide member to lock a sliding operation of the guide member; and a lever member which is slidably provided with respect to the guide member and provided to engage with the lock member, and which displaces the lock member in a direction moving away from the guide member by sliding from a lock position to an unlocked position. A first ratchet claw and a second ratchet claw are formed on the lock member, and a plurality of first ratchet recesses for being fitted to the first ratchet claw is provided on the guide member along a sliding direction of the guide member. A plurality of second ratchet recesses for being fitted to the second ratchet claw is provided on the lever member along a sliding direction of the guide member, and when the lever member is in the lock position, an arrangement relationship is formed in which the first ratchet recess and the second ratchet recess can be fitted to the first ratchet claw and the second ratchet claw, respectively. When the lever member is displaced from the lock position to the unlocked position, a slope surface of the second ratchet recess presses the second ratchet claw upward so that the lock member is displaced in a direction moving away from the guide member, and when the lever member is in the unlocked position, the first ratchet recess and the second ratchet recess are continuously formed along a sliding direction of the guide member arranged in an relationship in which at least one of the first ratchet recess and the second ratchet recess does not face the first ratchet claw in the case of the first ratchet recess or the second ratchet claw in the case of the second ratchet recess.

According to the invention, by operating the lever member, an arrangement with a relationship in which at least one of the first ratchet recess and the second ratchet recess does not face the first ratchet claw or the second ratchet claw is continuously formed along a sliding direction of the guide member. Therefore, the angle maintained by the ratchet mechanism can be canceled over the entire range of the tilt section, which is capable of rotating, by operating the lever member. As a result, even while the tilt section is reliably maintained at a predetermined angle by the ratchet mechanism, the maintaining state thereof can be easily released. Moreover, it is possible to return the tilt section to an original angle with good operability.

According to a second aspect of the invention, in the tilt angle maintaining apparatus according to the first aspect, it is preferable that the lever member includes a grip portion which is disposed in the vicinity of a rotating free end of the tilt section.

According to the invention, since the grip portion provided on the lever member is disposed in the vicinity of the rotating free end of the tilt section, the operation of rotating the tilt section can be performed with only one hand such that the other hand can maintain the rotating free end of the tilt section while the lever member is operated. Accordingly, the operability is improved.

According to a third aspect of the invention, in the tilt angle maintaining apparatus according to the first or second aspects, it is preferable that the tilt section includes a protrusion which forms a rotation center, and the device body includes a guide groove which guides the protrusion, and while the protrusion is displaced in the guide groove as the guide member slides, the tilt section rotates.

According to the invention, the rotation center of the tilt section is not fixed, but is able to move. The tilt section is configured to rotate while the protrusion formed on the rotation center slides in the guide groove provided on the device body. Therefore, even when the tilt section is provided to be embedded in the device body, the front surface of the tilt section can be prevented from being hidden by the upper surface disposed on the device body. That is, degradation in visibility can be prevented.

According to a fourth aspect of the invention, it is preferable that the recording apparatus including: a recording section which records on a recording medium; and the tilt angle maintaining apparatus according to the first to the third aspects which maintains the tilt angle of the tilt section which is provided with an operation setting section for setting various operations and an information display section for displaying a variety of information. According to the invention, in the recording apparatus for recording on a recording medium, the same operational advantage as that of the first can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
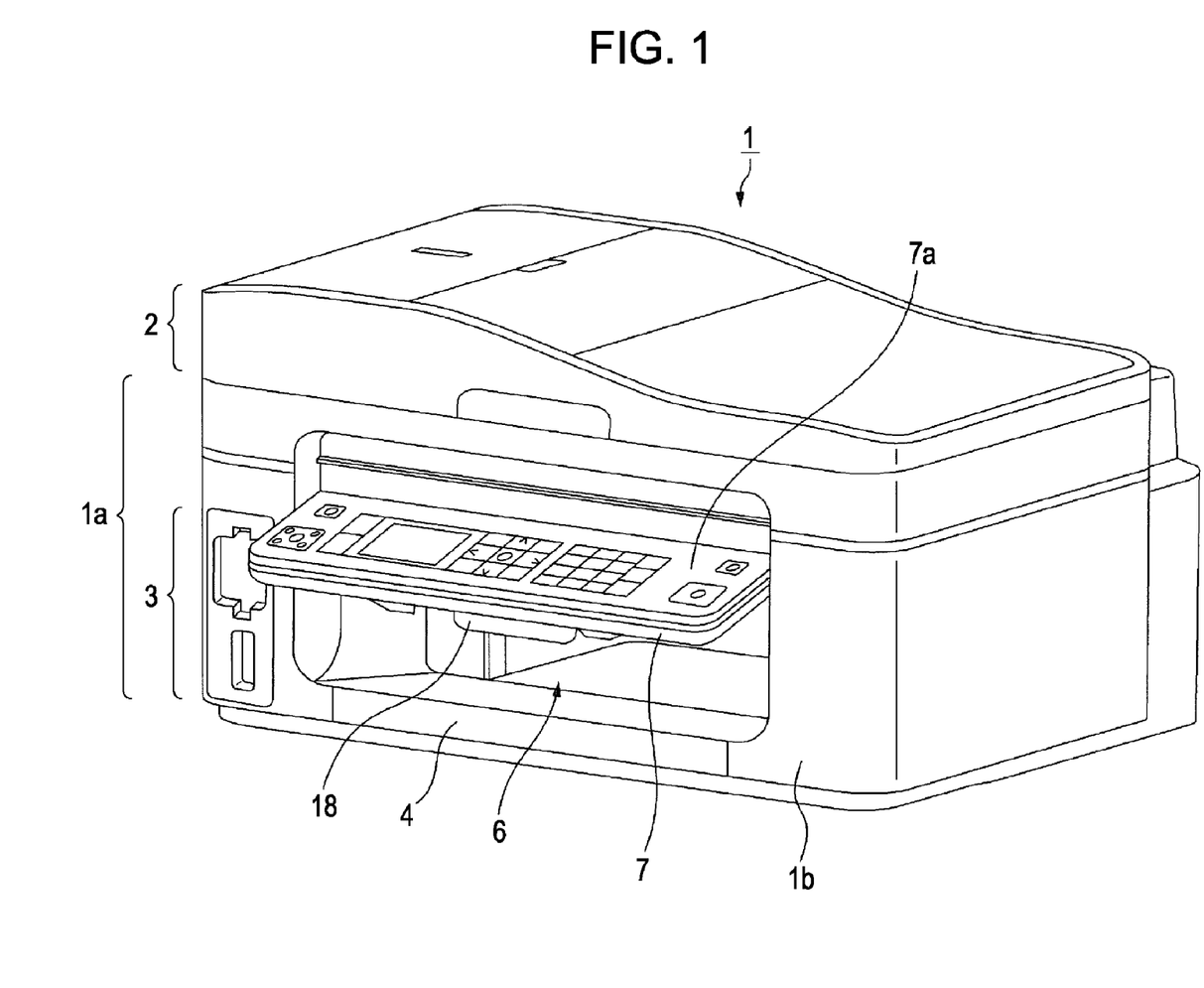
FIG. 1 is an external perspective view illustrating an appearance of an ink jet multifunction machine according to the invention.
Figure 2:
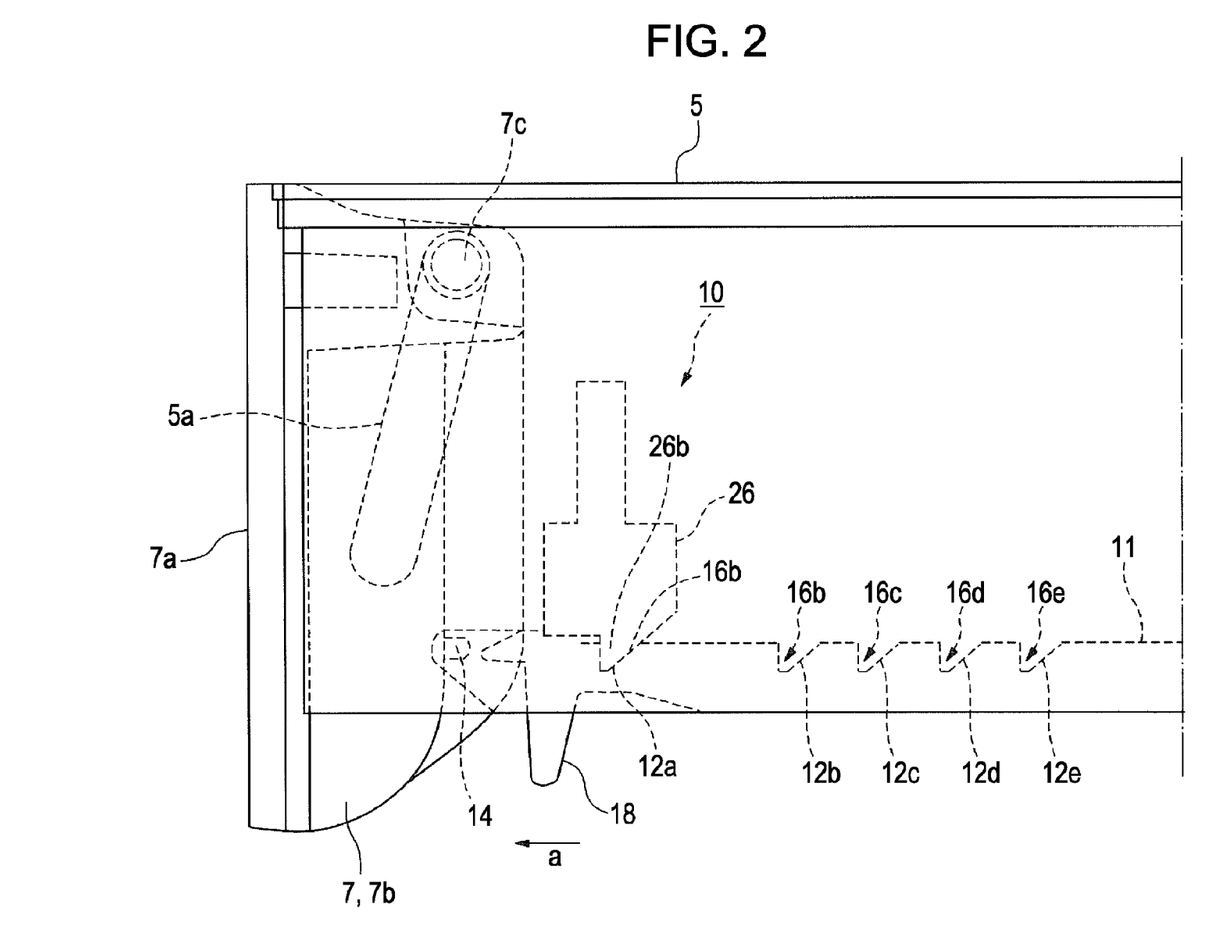
FIG. 2 is a side view illustrating an attaching portion of a tilt panel unit.
Figure 3:
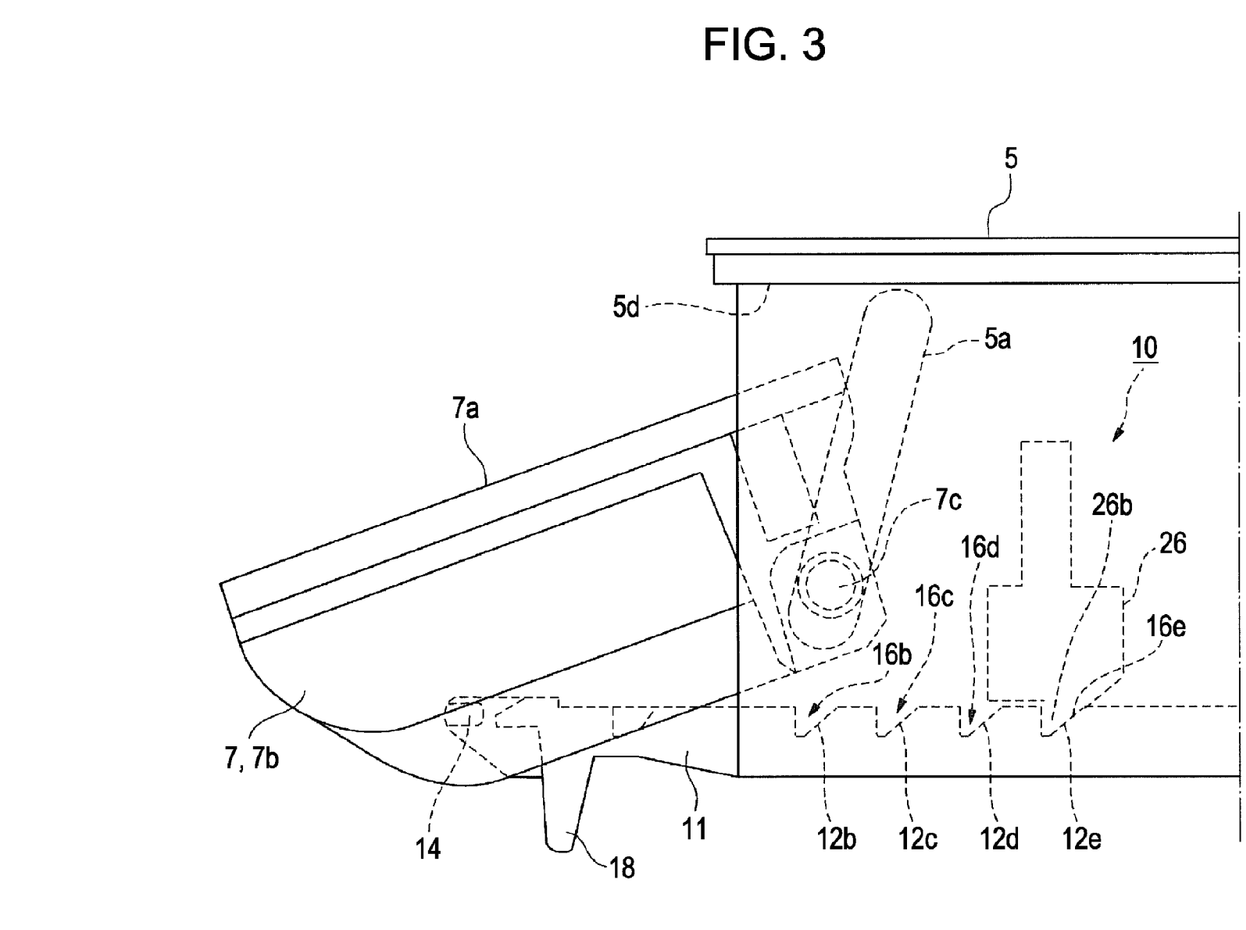
FIG. 3 is a side view illustrating an attaching portion of the tilt panel unit.
Figure 4:
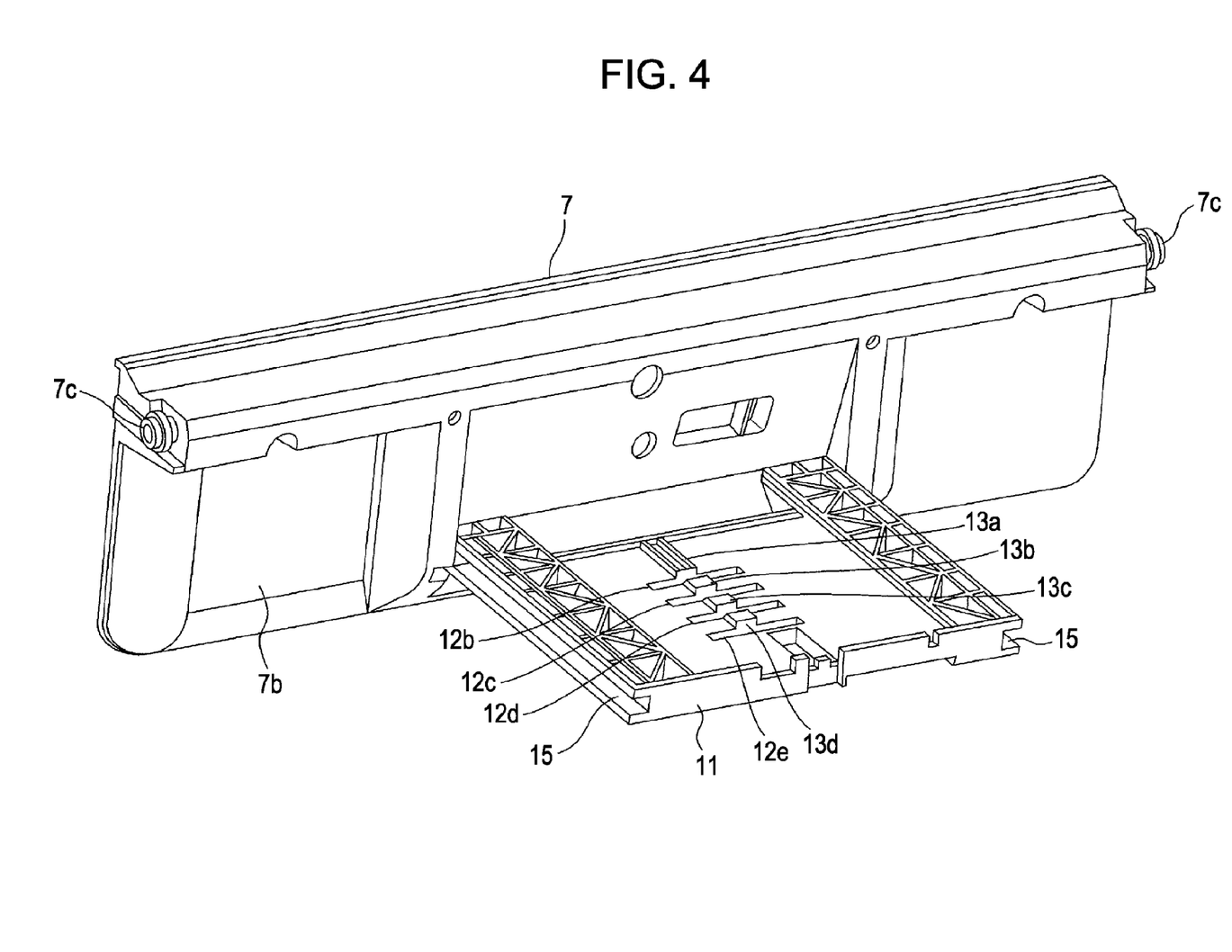
FIG. 4 is a perspective view illustrating a tilt panel unit as viewed from a rear surface side.
Figure 5:
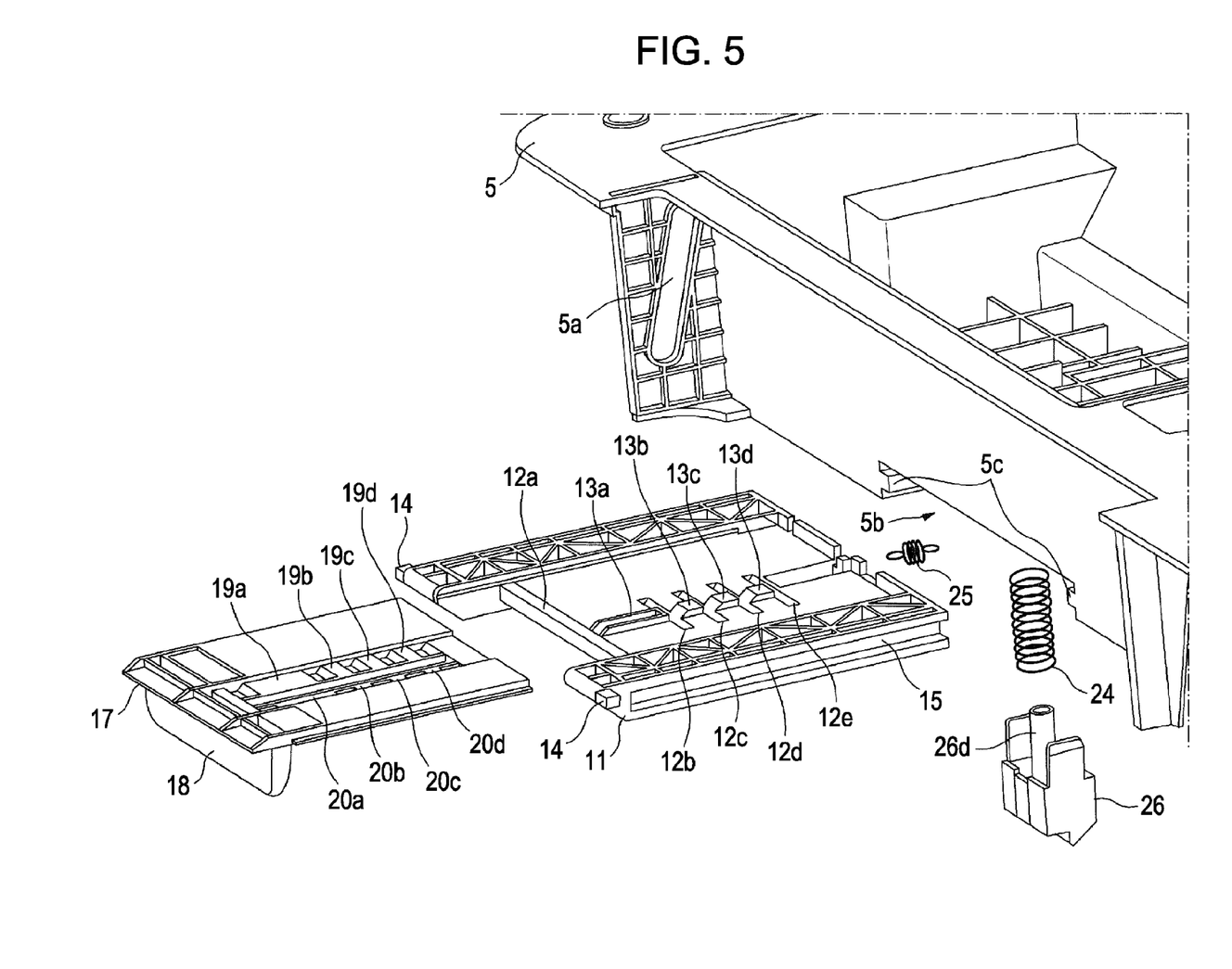
FIG. 5 is an exploded perspective view illustrating a tilt angle maintaining apparatus according to the invention.
Figure 6:
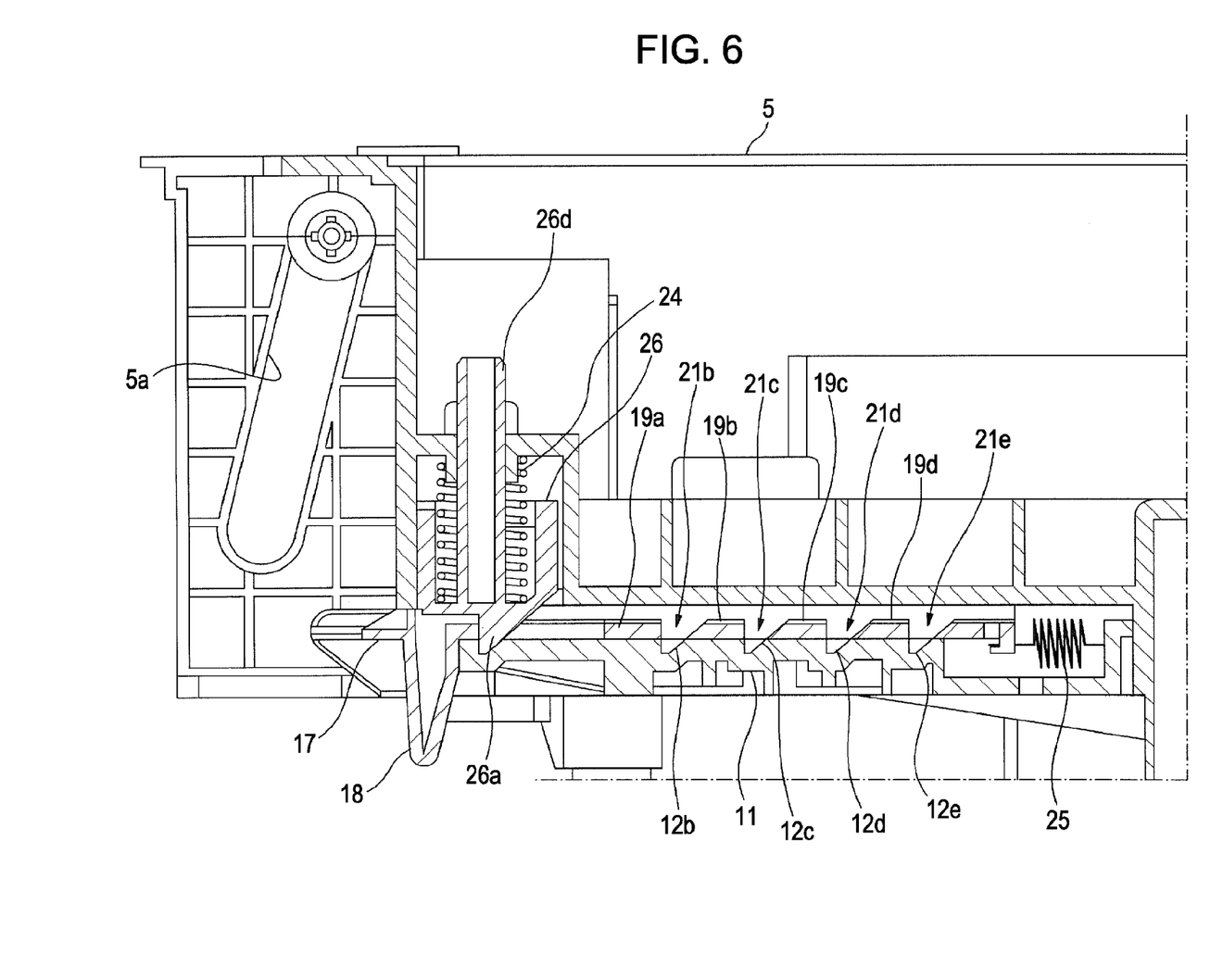
FIG. 6 is a cross-sectional view illustrating a tilt angle maintaining apparatus according to the invention.

Hereinafter, embodiments of the invention will be described with reference to FIGS. 1 to 10. Here, FIG. 1 is an external perspective view illustrating an appearance of an ink jet multifunction machine 1 according to the invention. FIGS. 2 and 3 are side views illustrating an attaching portion of a tilt panel unit 7. FIG. 4 is a perspective view illustrating the tilt panel unit 7 as viewed from a rear surface side (a view illustrating an attaching state of a guide member 11 to the tilt panel unit 7). FIG. 5 is an exploded perspective view of a tilt angle maintaining apparatus 10. FIG. 6 is a cross-sectional view illustrating the tilt angle maintaining apparatus 10.

Figure 7:
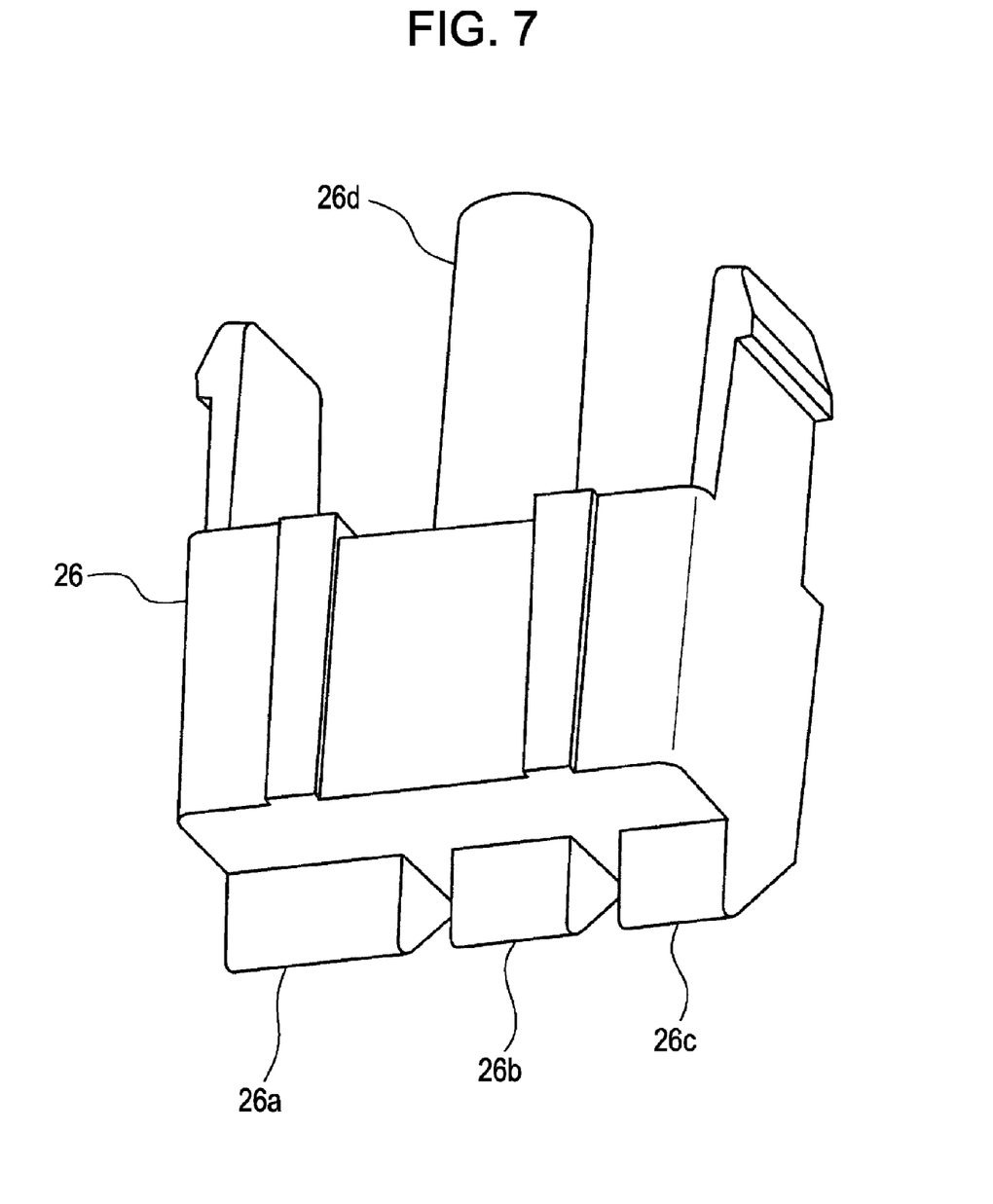
FIG. 7 is a perspective view illustrating a lock member.
Figure 8:
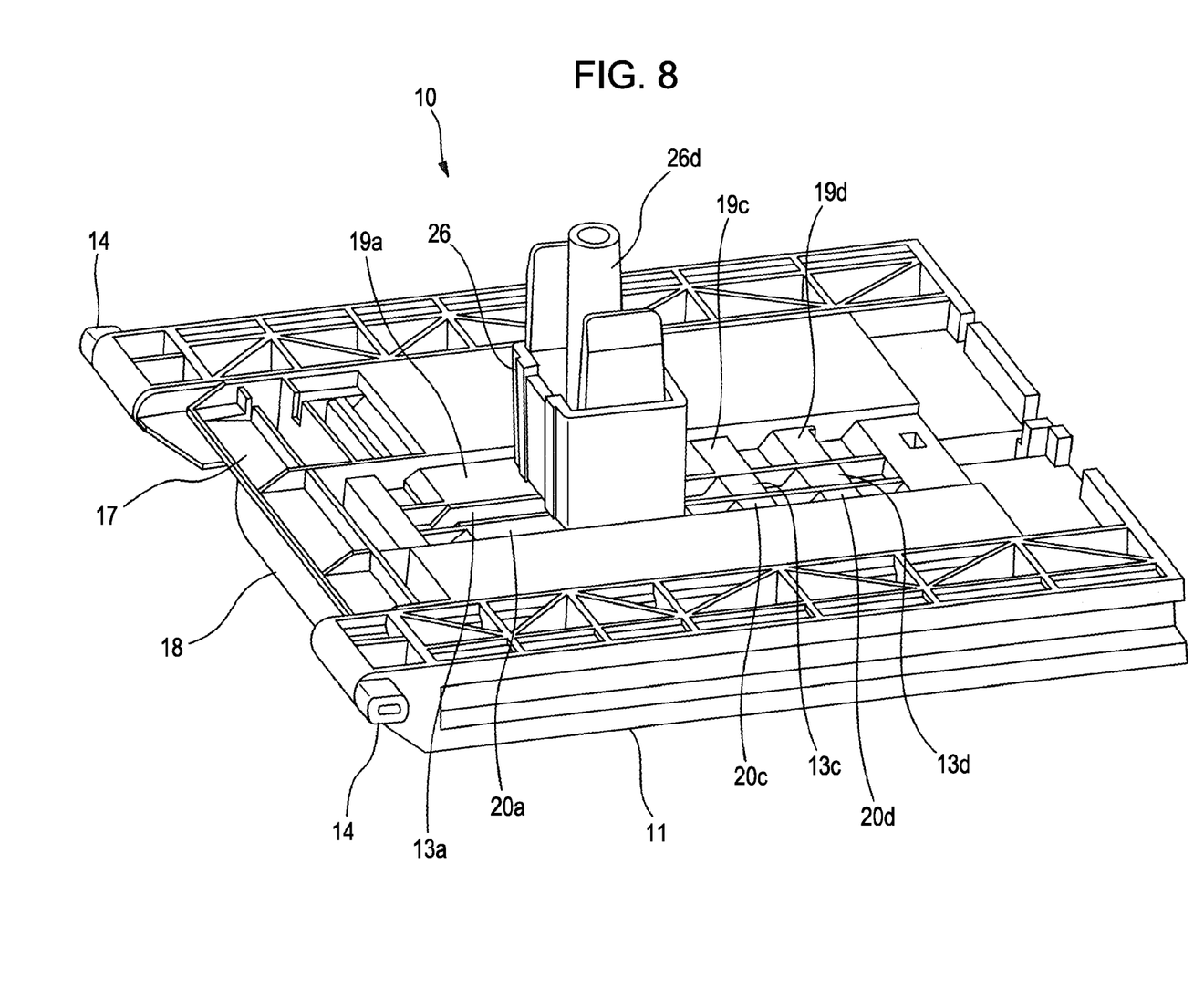
FIG. 8 is a perspective view illustrating a tilt angle maintaining apparatus according to the invention (a locked state).
Figure 9:
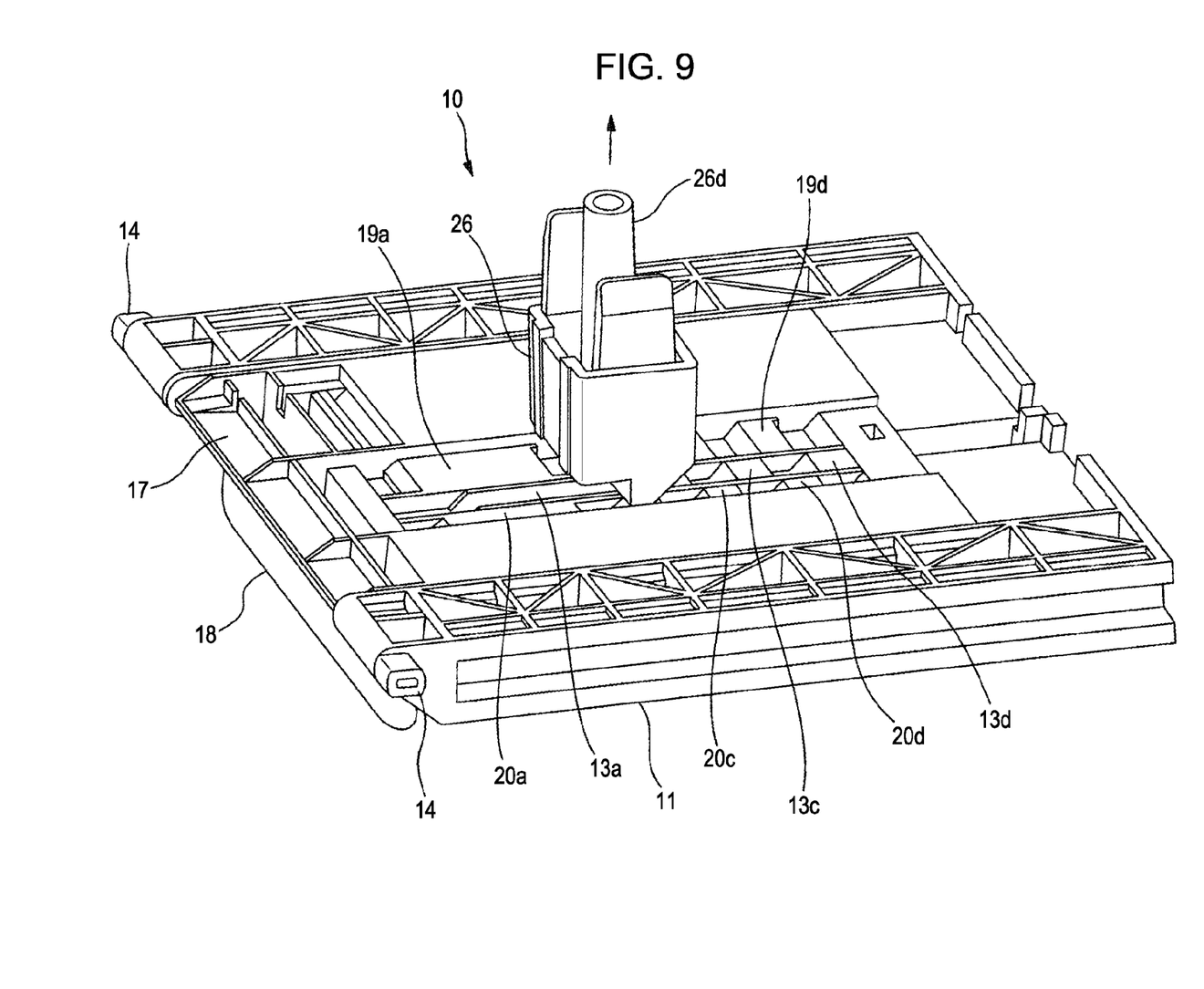
FIG. 9 is a perspective view illustrating a tilt angle maintaining apparatus according to the invention (an unlocked state).
Figure 10:
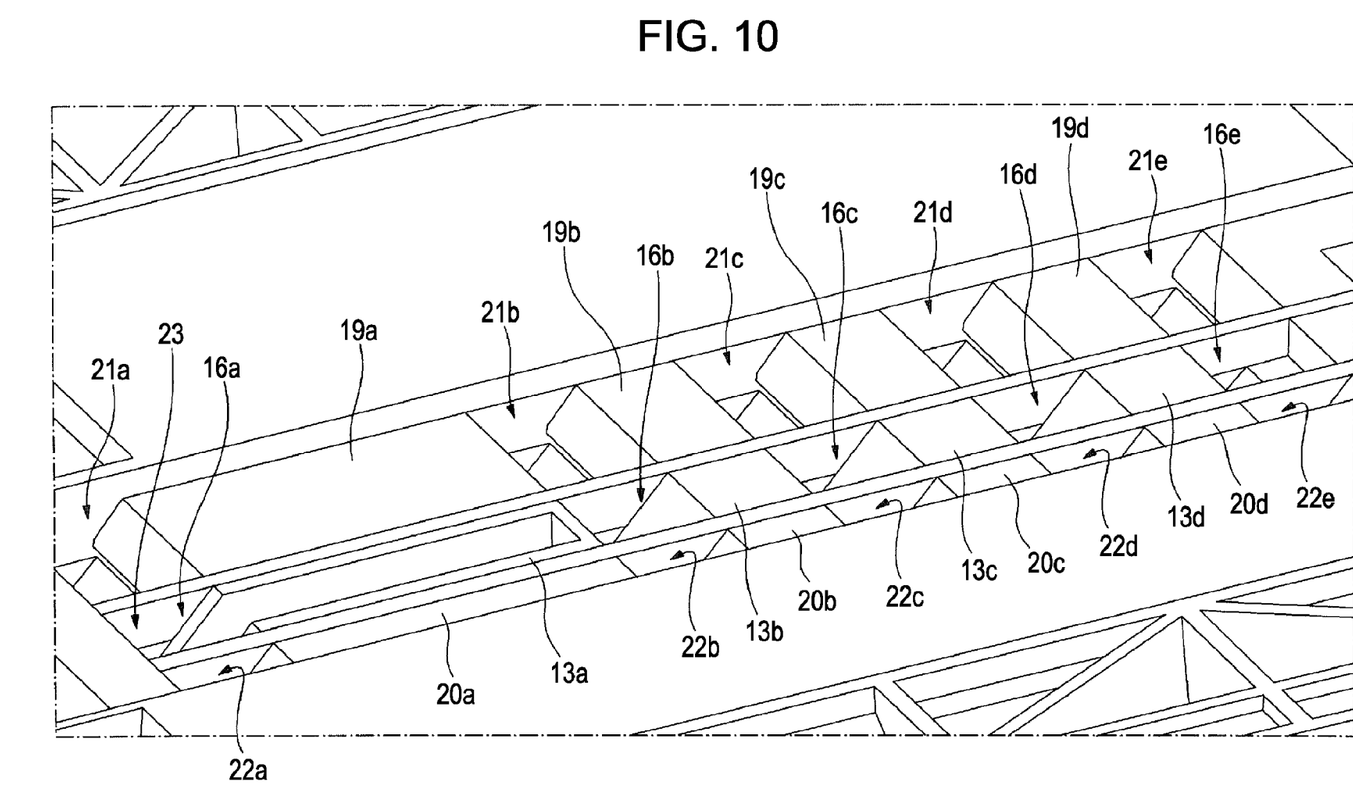
FIG. 10 is an enlarged view illustrating a part of a tilt angle maintaining apparatus according to the invention (a locked state).
Figure 11:
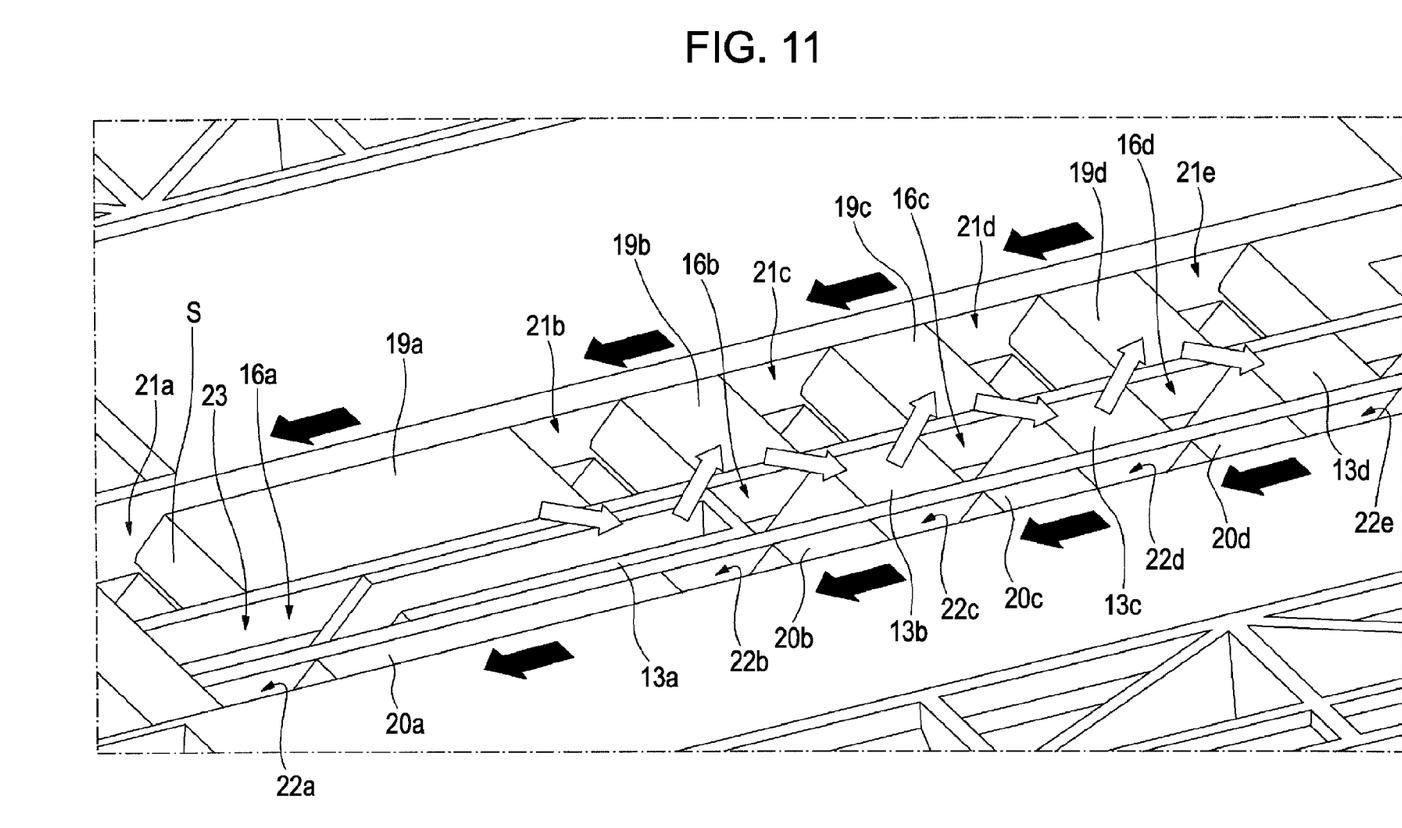
FIG. 11 is an enlarged view illustrating a part of a tilt angle maintaining apparatus according to the invention (an unlocked state).

In addition, FIG. 7 is a perspective view illustrating a lock member 26. FIGS. 8 and 9 are perspective views illustrating the tilt angle maintaining apparatus 10. FIG. 8 shows a locked state, and FIG. 9 shows an unlocked state. Further, FIGS. 10 and 11 are enlarged perspective views illustrating a part of the tilt angle maintaining apparatus 10. FIG. 10 shows the locked state, and FIG. 11 shows the unlocked state.

In the following, as an example of a recording apparatus which performs recording on a recording medium, configurations capable of being understood from the outside of the ink jet multifunction machine 1 according to the invention will be described with reference to FIG. 1. The ink jet multifunction machine 1 is an ink jet multifunction machine which includes both an ink jet printer mechanism as a recording execution section for executing the recording on the recording medium and a scanner mechanism. Reference numeral 1a shows an apparatus body which is provided with the ink jet printer mechanism and the scanner mechanism. In addition, reference numeral 2 shows a platen cover 2 which is provided on the upper portion of the apparatus body 1a and opens and closes a platen (not shown) of the scanner mechanism.

Reference numeral 3 shows a recording medium inserting section which is used to insert the storage medium (not shown) containing image data or the like. The ink jet multifunction machine 1 is configured as a so-called stand-alone type printer in which the image data stored in the storage medium inserted into the storage medium inserting section 3 can be independently recorded by the ink jet heads without an external computer.

Reference numeral 4 shows an ejection tray which is provided on the bottom of the apparatus and a support surface for supporting the paper being drawn out from the apparatus to the front side thereof. The recorded paper is discharged to and supported by the ejection tray 4. In addition, reference numeral 6 shows a paper discharging port which discharges the recorded paper.

Reference numeral 7 shows a tilt panel unit. The tilt panel unit is provided with an information display section configured of a liquid crystal module and the like for displaying a variety of information such as a preview image, a user interface, or the like on a front surface (panel surface) 7a. In addition, the tilt panel unit is provided with an operation setting section configured of a power button, a recording button, an image reading button, setting buttons for performing various operation settings, and the like in a front surface (panel surface) 7a.

The tilt panel unit 7, which is rotatable (tilt) and able to slide, is provided on a lower frame 5 (refer to FIG. 2) which constitutes a substrate of the ink jet multifunction machine 1. In addition, the tilt angle of the tilt panel unit 7 is configured so as to be maintained to form an inclination angle with respect to the tilt angle maintaining apparatus 10 to be described later as shown in FIG. 1, for example. Therefore, the tilt panel unit 7 can be maintained at an arbitrary angle with good visibility and good operability for the user.

The tilt angle maintaining apparatus 10 will be described with reference to FIGS. 2 to 11.

In the following, first, the operation of the tilt panel unit 7 will be described. In FIGS. 2 to 4, reference numeral 7c denotes a protrusion which serves as the rotation center of the tilt panel unit 7. The protrusion 7c is provided on each of both ends of a main body 7b of the tilt panel unit 7.

On the other hand, the tilt panel unit 7 is provided so as to be embedded in a front surface 1b of the apparatus body 1a. Guide grooves 5a as shown in FIGS. 2, 3, 5 and 6 are formed on both sides of the interior of the recess in which the tilt panel unit 7 is embedded. The guide groove 5a is formed such that the upper portion thereof is positioned on the inner side (the right side in FIGS. 2 and 3) of the apparatus so as to be somewhat obliquely extended in the vertical direction. The protrusion 7c provided on each of both ends of the tilt panel unit 7 is loosely inserted into the guide groove 5a.

Next, in the lower frame 5, the guide member 11, which is able to slide, is provided in the front and rear directions (right and left directions in FIGS. 2 and 3) of the apparatus. A boss 14 formed on the guide member 11 is loosely inserted into a receiving portion (not shown) which is formed on the main body 7b of the tilt panel unit 7. The guide member 11 and the tilt panel unit 7 are attached to each other so as to be rotated in relation to one another by the boss 14.

FIG. 2 shows a state in which the tilt panel unit 7 is maintained in a vertical attitude. In this state, the protrusion 7c is positioned on the uppermost portion of the guide groove 5a.

Further, in this state, the panel surface 7a substantially becomes flush with the front surface 1b of the apparatus body 1a.

When the rotating free end (lower end portion) of the tilt panel unit 7 in this state is drawn to the front side (the left direction in FIGS. 2 and 3) of the apparatus, the tilt panel unit 7 rotates as shown in the change from FIG. 2 to FIG. 3. At the same time, the panel surface 7a moves downward such that the protrusion 7c moves downward in the guide groove 5a. In addition, a sufficient gap is secured between the panel surface 7a and a wall surface (which is denoted by reference numeral 5d) disposed on the upper portion of the panel surface 7a. Therefore, the degradation in visibility is prevented.

In addition, reference numeral 26 shows a lock member which is provided in a reciprocating manner with respect to the guide member 11. Reference numeral 26b shows a second ratchet claw which is formed on the lock member 26. In addition, reference numeral 16a to 16e show second ratchet recesses to be described later.

As shown in FIGS. 2 and 3, when the ratchet claw 26b is inserted into any one of the second ratchet recesses 16a to 16e, the guide member 11 is locked not to move to the inner side (the right side in FIGS. 2 and 3) of the apparatus. As a result, even when pressing force is applied to the panel surface 7a of the tilt panel unit 7, the tilt angle (bias) is maintained in order for the tilt panel unit 7 not to rotate due to this pressing force.

In addition, reference numeral 18 shows a lever section which is provided on a lever member 17 to be described later. When the lever section 18 is operated (drawn) as an arrow a shown in FIG. 2, the lock member 26 is retreated to the upper portion, and a fitted state between the ratchet claw 26b and the second ratchet recesses 16a to 16e is released. That is, the locked state of the guide member 11 is released, so that the tilt panel unit 7 comes to be in a state enabling rotation.

In addition, as is apparent from FIGS. 2 and 3, the second ratchet claw 26b and the second ratchet recesses 16a to 16e is provided with saw-shaped teeth of which direction is set such that the guide member 11 slides in a front direction of the apparatus. When the tilt panel unit 7 is tilted to be in a horizontal attitude, the lever section 18 is not necessary to be operated.

In addition, as described later, when the tilt panel unit 7 is returned to a vertical attitude shown in FIG. 2 from the attitude shown in FIG. 3, if the rotating free end of the tilt panel unit 7 is pushed into the inner side of the apparatus while the lever section 18 is maintained in the drawn state, the second ratchet claw 26b is not fitted into the entire second ratchet recesses 16a to 16e, that is, not switched to the locked state until the tilt panel unit 7 is returned to be the vertical attitude shown in FIG. 2.

In addition, the ratchet fitted section configured to include the ratchet claw and the ratchet recess is actually further provided in a direction (a vertical direction with respect to the paper of FIGS. 2 and 3) perpendicular to the sliding direction of the guide member 11, the details of which will be described later.

Hereinbefore, the operation (an outline of the configuration of the tilt angle maintaining apparatus 10) of the tilt panel unit 7 has been described. In the following, the configuration of the tilt angle maintaining apparatus 10 will be described in detail with reference to FIGS. 4 to 11.

As shown in FIG. 5, the tilt angle maintaining apparatus 10 includes the guide member 11, the lock member 26, the lever member 17, a pressing spring 24, and a tensing spring 25.

The guide member 11 includes guide grooves 15 on both sides thereof. The guide grooves 15 are fitted into guide rails 5c which are formed on both sides of the interior of the recess 5b formed in the lower frame 5, and thus the guide grooves are provided to slide with respect to the lower frame 5.

As shown in FIGS. 4 to 6, in the guide member 11, common ratchet recesses denoted by reference numerals 12a to 12e are disposed at predetermined intervals along the guide direction of the guide member 11. In addition, between the common ratchet recesses, release protrusions 13a to 13d disposed on the guide are formed. When the lever member 17 to be described later is provided on the guide member 11, the release protrusions 13a to 13d disposed on the guide are inserted into a long groove 23 (which extends in the sliding direction of the guide member 11) which is formed in the lever member 17 (refer to FIGS. 8 to 11).

In a state where the lever member 17 is provided on the guide member 11, first ratchet recesses 16a to 16e to be described later are partitioned before and after and between the release protrusions 13a to 13d disposed on the guide (refer to FIGS. 10 and 11).

As shown in FIGS. 4 to 9, the lever member 17 is provided on the upper portion of the guide member 11 (between the guide member 11 and the lower frame 5) to slide in the sliding direction of the guide member 11. The above-mentioned lever section 18 is formed on the front side of the apparatus.

In the lever member 17, the second ratchet recesses 21a to 21e and 22a to 22e are formed at a predetermined interval along the sliding direction. In addition, the release protrusions 19a to 19d and 20a to 20d disposed on the lever are formed between the ratchet recesses.

In addition, the lever member 17 is provided in a state urged toward the inner side of the apparatus on the guide member 11 by the tensing spring 25 which applies an urging force to an interval of the lower frame 5.

The lock member 26 includes a shaft 26d as shown in FIG. 7. The lock member 26, which is capable of sliding, is provided on the lower frame 5 via the shaft 26d. As shown in FIG. 6, the pressing spring 24 is provided on the shaft 26d, so that the lock member 26 is provided in a state urged toward the guide member 11.

Returning to FIG. 7, the first ratchet claw 26b is provided at the tip of the lock ember 26 and the second ratchet claws 26a and 26c are also provided on each of both ends of the first ratchet 26b. These ratchet claws are fitted to the ratchet recesses which are formed in the guide member 11 and the lever member 17, so that the guide member 11 is locked.

Subsequently, the first ratchet recesses 16a to 16e and the second ratchet recesses 21a to 21e and 22a to 22e will be described with reference to FIGS. 8 to 11.

FIG. 8 shows the guide member 11, the lever member 17, and the lock member 26 when the guide member 11 is in the locked state. FIG. 10 shows the arrangement with the relationship between the respective ratchet recesses when the guide member 11 is in the locked state. In addition, FIG. 9 shows the guide member 11, the lever member 17, and the lock member 26 when the guide member 11 is in the unlocked state. FIG. 11 shows the arrangement with the relationship between the respective ratchet recesses when the guide member 11 is in the unlocked state.

As shown in FIGS. 8 and 10, in the locked state (lockable state) of the guide member 11, the first ratchet recesses 16a to 16e and the second ratchet recesses 21a to 21e and 22a to 22e are arranged in a horizontal relationship. As a result, the arrangement of the first ratchet claw 26b formed on the lock member 26 and the second ratchet claws 26a and 26c comes to be in a relationship enabling them to be fitted to the respective ratchet recesses.

In addition, the first ratchet claw 26*b* is fitted to any one of the first ratchet recesses 16*a* to 16*e*. The second ratchet claw 26*a* is fitted to any one of the second ratchet recesses 21*a* to 21*e*. The second ratchet claw 26*c* is fitted to any one of the second ratchet recesses 22*a* to 22*e*. Further, in the locked state shown in FIG. 10, the common ratchet recesses 12*a* to 12*e* formed in the guide member 11 are positioned below the respective ratchet recesses. As a result, the respective ratchet claws come to be further deeply fitted with the respective ratchet recesses. Further, the position of the lever member 17 at this time is referred to as the "lock position".

Next, when the lever member 17 slides to the front side of the apparatus with respect to the guide member 11 due to the operation of the lever section 18 as described above from the locked state (lockable state), the second ratchet recesses 21*a* to 21*e* and 22*a* to 22*e* correspondingly move with respect to the first ratchet recesses 16*a* to 16*e* as shown by the black arrow in FIG. 11.

Here, the surfaces of the second ratchet recesses 21*a* to 21*e* and 22*a* to 22*e* with which the second ratchet claws 26*a* and 26*c* formed on the lock member 26 come into contact are formed to have a slope surface (for example, the slope surface of the second ratchet recess 21*a* is denoted by the letter S in FIG. 11).

The second ratchet claws 26*a* and 26*c* formed on the lock member 26 are pressed upward by the slope surface S. That is, the lock member 26 is pressed upward, so that the first ratchet claw 26*b* and the second ratchet claws 26*a* and 26*c* release the fitting state between the ratchet claws and the respective ratchet recesses. Further, the position of the lever member 17 at this time is referred to as the "unlocked position".

Here, in a state where the lever member 17 is in the unlocked position, for example, when the first claw 26*b* and the second ratchet claws 26*a* and 26*c* are in positions (positions facing the ratchet recesses) enabling the first ratchet claw 26*b* to be fitted with the first ratchet recess 16*b*, the second ratchet claws 26*a* and 26*c* are in positions facing the release protrusions 19*b* and 20*b* disposed on the lever, respectively. As a result, no ratchet claw is arranged in a relationship enabling the ratchet claw to be fitted (engaged) to the ratchet recess.

That is, unlike the locked state, the first ratchet recesses 16*a* to 16*e* and the second ratchet recesses 21*a* to 21*e* and 22*a* to 22*e* are not horizontally arranged, but arranged differently from each other. That is, the respective ratchet recesses are arranged in a relationship in which at least one part of the first ratchet recesses 16*a* to 16*e* and the second ratchet recesses 21*a* to 21*e* and 22*a* to 22*e* does not face the first ratchet claw 26*b* or the second ratchet claws 26*a* and 26*c* (making it impossible to for them to engage with each other).

The relationship is arranged to be continuously formed without interruption along the sliding direction of the guide member 11 shown by a white arrow in FIG. 11. As a result, maintenance of the tilt angle (the locked state of the guide member 11) by the respective ratchet claws and the respective ratchet recesses is released over the entire range of the rotatable tilt panel unit 7.

Therefore, for example, when the tilt panel unit 7 shown in FIG. 3 is returned from the rotated state to the vertical attitude shown in FIG. 2, the tilt panel unit 7 can be smoothly returned to the original attitude by press-inserting the rotating free end of the tilt panel unit 7 with the drawn lever section 18, without the guide member 11 becoming locked during the return.

In addition, when the user desires to maintain the tilt panel unit 7 at a tilt angle during the return, the guide member 11 can be returned to the locked state shown in FIG. 10 by the user removing their hand from the lever section 18. Therefore, the tilt panel unit 7 can be maintained at a predetermined tilt angle during rotation no matter what rotation direction.

According to the tilt angle maintaining apparatus 10 as described above, the tilt angle of the tilt panel unit 7 is reliably maintained by engaging the respective ratchet claws with the respective recesses. In addition, this maintenance state can be easily released by operating the lever section 18 (lever member 17). Moreover, the tilt panel unit 7 can be returned to the vertical attitude with good operability.

In addition, in this embodiment, since the lever section (a gripping unit) 18 is disposed in the vicinity of the rotating free end of the tilt panel unit 7, the operation of returning the rotating free end of the tilt panel unit 7 to the vertical attitude by press-insertion can be performed with only one hand operating the lever section 18. Therefore, it is possible to obtain very good operability.

The embodiment described above is only an example, and various changes can be made. For example, in this embodiment, the respective ratchet recesses are horizontally arranged in the locked state as shown in FIG. 10, and the respective recesses are differently arranged from each other in the unlocked state as shown in FIG. 11. However, on the contrary, it may be configured such that the respective ratchet recesses are differently arranged from each other in the locked state as shown in FIG. 11, and the respective ratchet recesses are horizontally arranged in the unlocked state as shown in FIG. 10.

What is claimed is:

1. A tilt angle maintaining apparatus for maintaining a tilt angle of a tilt section, comprising:
   a tilt section which is rotatably provided with respect to a device body;
   a guide member which is slidably provided with respect to the device body and engaged with the tilt section to maintain an attitude of the tilt section;
   a lock member which is provided in the device body in a reciprocating manner with respect to the guide member, and advances with respect to the guide member to lock a sliding operation of the guide member; and
   a lever member which is slidably provided with respect to the guide member and provided to engage with the lock member, and which displaces the lock member in a direction moving away from the guide member by sliding from a lock position to an unlocked position,
   wherein a first ratchet claw and a second ratchet claw are formed on the lock member,
   wherein a plurality of first ratchet recesses for being fitted to the first ratchet claw is provided on the guide member along a sliding direction of the guide member,
   wherein a plurality of second ratchet recesses for being fitted to the second ratchet claw is provided on the lever member along a sliding direction of the guide member,
   wherein when the lever member is in the lock position, an arrangement relationship is formed in which the first ratchet recess and the second ratchet recess can be fitted to the first ratchet claw and the second ratchet claw, respectively,
   wherein when the lever member is displaced from the lock position to the unlocked position, a slope surface of the second ratchet recess presses the second ratchet claw upward so that the lock member is displaced in a direction moving away from the guide member, and
   wherein when the lever member is in the unlocked position, the first ratchet recess and the second ratchet recess are continuously formed along a sliding direction of the guide member arranged in an relationship in which at least one of the first ratchet recess and the second ratchet recess does not face the first ratchet claw in the case of the first ratchet recess or the second ratchet claw in the case of the second ratchet recess.

2. The tilt angle maintaining apparatus according to claim 1,
wherein the lever member includes a grip portion which is disposed in the vicinity of a rotating free end of the tilt section.

3. The tilt angle maintaining apparatus according to claim 1,
wherein the tilt section includes a protrusion which forms a rotation center, and the device body includes a guide groove which guides the protrusion, and
wherein while the protrusion is displaced in the guide groove as the guide member slides, the tilt section rotates.

4. A recording apparatus comprising:
a recording section which performs recording on a recording medium; and
the tilt angle maintaining apparatus according to claim 1 which maintains a tilt angle of the tilt section and which is provided with an operation setting section for setting various operations and an information display section for displaying a variety of information.

* * * * *